(12) United States Patent
Silberman et al.

(10) Patent No.: US 11,757,850 B2
(45) Date of Patent: *Sep. 12, 2023

(54) DISTRIBUTED LOGGING FOR SECURING NON-REPUDIABLE MULTI-PARTY TRANSACTIONS

(71) Applicant: Cerebri AI Inc., Austin, TX (US)

(72) Inventors: Gabriel M. Silberman, Austin, TX (US); Jean Belanger, Austin, TX (US); Karen Bennet, Toronto (CA); Michael L. Roberts, Austin, TX (US); Jay M. Williams, Austin, TX (US)

(73) Assignee: Cerebri AI Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,775

(22) Filed: Jun. 29, 2021

(65) Prior Publication Data

US 2022/0014504 A1 Jan. 13, 2022

Related U.S. Application Data

(63) Continuation of application No. 16/656,074, filed on Oct. 17, 2019, now Pat. No. 11,082,409, which is a continuation of application No. 15/723,346, filed on Oct. 3, 2017, now Pat. No. 10,484,343.

(51) Int. Cl.
| | |
|---|---|
| *H04L 9/40* | (2022.01) |
| *G06F 21/62* | (2013.01) |
| *G06F 21/60* | (2013.01) |
| *G06F 21/00* | (2013.01) |

(52) U.S. Cl.
CPC .......... *H04L 63/0428* (2013.01); *G06F 21/60* (2013.01); *G06F 21/62* (2013.01); *G06F 21/6218* (2013.01); *H04L 63/08* (2013.01); *H04L 63/12* (2013.01)

(58) Field of Classification Search
CPC ........ G06F 21/60; G06F 21/602; G06F 21/62; G06F 21/6245; G06F 21/6254; G06F 21/64; G06F 21/645; H04L 9/088; H04L 9/32; H04L 9/321; H04L 9/3218; H04L 9/3236
See application file for complete search history.

(56) References Cited

U.S. PATENT DOCUMENTS

| | | | |
|---|---|---|---|
| 2016/0321751 A1* | 11/2016 | Creighton, IV | ....... G06Q 40/04 |
| 2017/0109735 A1* | 4/2017 | Sheng | ................ G06Q 20/3678 |

* cited by examiner

*Primary Examiner* — Edward Zee
(74) *Attorney, Agent, or Firm* — Pillsbury Winthrop Shaw Pittman LLP

(57) ABSTRACT

Disclosed herein are methods, systems, and processes for distributed logging for securing non-repudiable transactions. Credentials, request information, response information, and action items generated and received by a requesting computing system and a responding computing system, and transmitted between the requesting computing system and the responding computing system are separately recorded and stored in a requestor log maintained by the requesting computing system and in a responder log maintained by the responding computing system.

19 Claims, 10 Drawing Sheets

DISTRIBUTED LOGGING FOR SECURING NON-REPUDIABLE MULTI-PARTY TRANSACTIONS

This application is a continuation of U.S. patent application Ser. No. 16/656,074 titled "VERIFYING MESSAGE AUTHENTICITY WITH DECENTRALIZED TAMPER-EVIDENT LOGS" filed on Oct. 17, 2019, which is a continuation of U.S. patent application Ser. No. 15/723,346 titled "DISTRIBUTED LOGGING FOR SECURING NON-REPUDIABLE MULTI-PARTY TRANSACTIONS" filed on Oct. 3, 2017. The entire content of the aforementioned patent filing is hereby incorporated by reference.

FIELD OF THE DISCLOSURE

This disclosure relates to data security and, more particularly, to distributed logging for securing non-repudiable transactions.

DESCRIPTION OF THE RELATED ART

Computing systems and the software utilized by such computing systems are typically built from various hardware and software components developed and/or operated by a variety of disparate providers (e.g., storage providers, cloud computing providers, and the like). In such computing environments, effectively and securely establishing the function of computing systems requires information or data to be reliably transmitted among the various hardware and software components. One method of protecting the integrity of such transactions and establishing reliable transaction records involves utilizing transaction records (e.g., logs).

Even if data communications are properly authenticated when establishing communication(s) among two or more computing systems (or computing system components), data traffic among these systems and/or components can become compromised. For example, information sent in a request, results received, and/or one or more actions taken could be disrupted or modified, either by a "man in the middle" actor, or by either of the communicating parties, whether maliciously or as a result of human or computing error. Such disruption or modification can occur during the transactions, while the transactions are in the process of being recorded (e.g., in logs by one of the parties), or a-posterior (e.g., as the result of log tampering).

Specific action items in a request, the results returned, and/or the action taken must be non-repudiable (e.g., for auditing purposes). Unfortunately, existing computing environments do not provide methods, systems and processes for reconciling requests with results among computing systems and/or computing components executing on disparate computing domains.

SUMMARY OF THE DISCLOSURE

Disclosed herein are methods, systems, and processes for distributed logging for securing non-repudiable transactions. One such method involves receiving a request message from a requesting computing system. In this example, the request message includes action items, the action items are associated with a transaction between the requesting computing system and a responding computing system, and the action items are added to a requestor log by the requesting computing system prior to the request message being transmitted to the responding computing system. The method then stores the action items in a responder log, and transmits data responsive to the action items to the requesting computing system.

In one embodiment, the method accesses a blockchain log upon receiving the request message, and determining that the action items in the request message is stored in the blockchain log. In this example, the method updates the blockchain log to indicate transmission of the data responsive to the action items prior to transmitting the data to the requesting computing system. In some embodiments, the requestor log is maintained by the requesting computing system, and the responder log is maintained by the responding computing system.

In certain embodiments, a copy of the blockchain log is maintained by the requesting computing system, the responding computing system, and an external computing system. In some embodiments, the method accesses the blockchain log, and performs an audit transaction to verify the transaction between the requesting computing system and the responding computing system. In other embodiments, the blockchain log is a distributed ledger.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
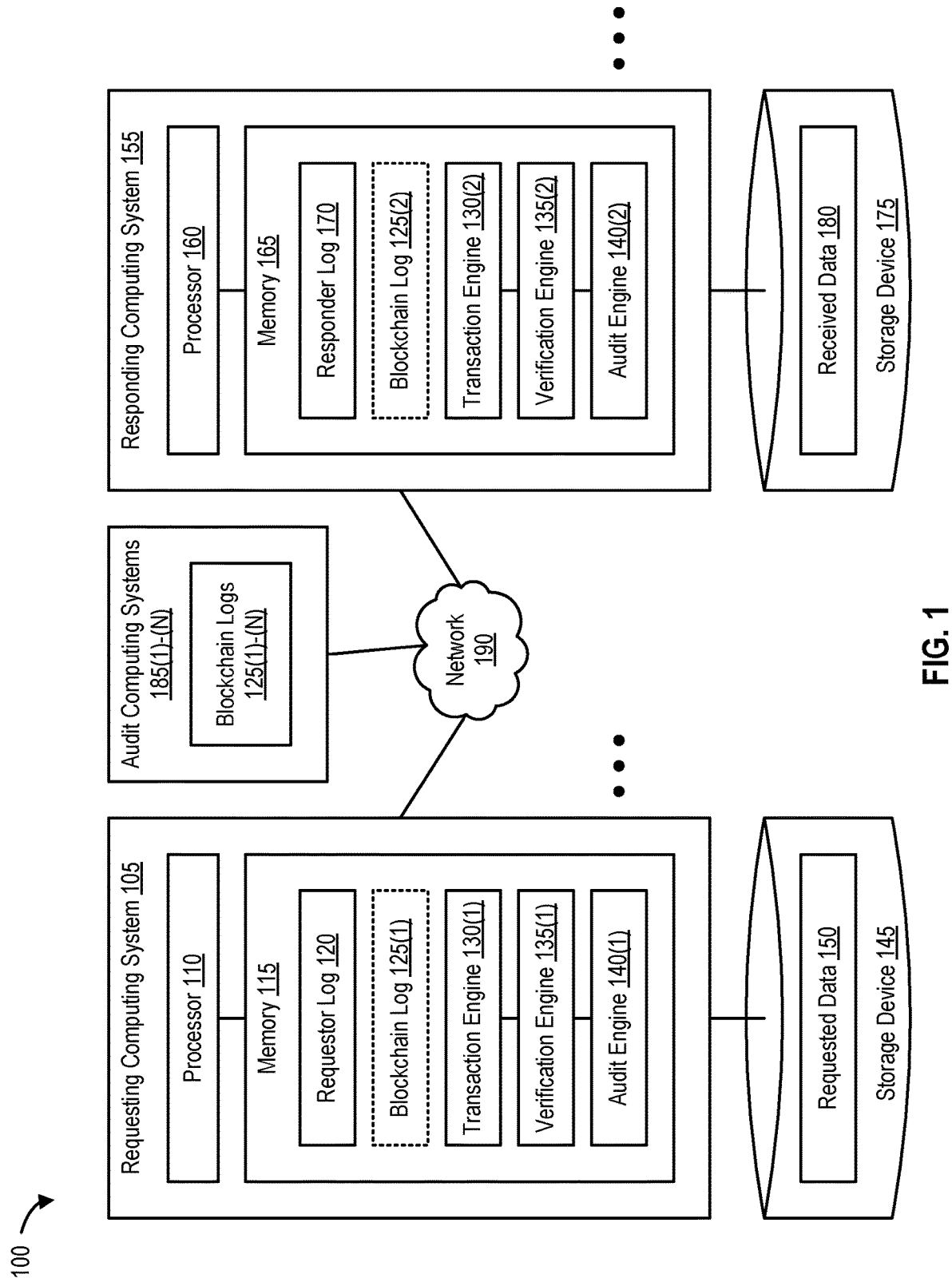
FIG. 1 is a block diagram of a computing system that performs distributed logging in blockchain computing environments, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

As previously noted, computing systems and the software utilized by such computing systems are typically built from various hardware and software components developed and/or operated by a variety of disparate providers (e.g., storage providers, cloud computing providers, and the like). In such computing environments, effectively and securely establishing the function of computing systems requires information or data to be reliably transmitted among the various hardware and software components (e.g., for protecting data integrity and establishing reliable transaction records). One method of protecting the integrity of such transactions and establishing reliable transaction records involves the utilization and implementation of transaction records (e.g., logs, and the like).

For example, a logistics company implementing goods order fulfillment operations (e.g., via software for ordering goods and services) may require the routing, scheduling, and tracking of goods through computing systems and via fleets of vehicles transporting such goods. If a given package is not delivered as required or promised, the integrity of data communications (e.g., between the order fulfillment entity and the logistics company) enables the logistics company to reliably identify and track the point of failure as well as the current location of the package (e.g., the pickup order may not have been sent and/or received, the package may have been picked up but may have been lost at some stage of transport, and/or may have been delivered to the wrong location, and the like).

In another example, a financial institution may use a credit scoring service to make decisions on engaging with a given individual for approving a loan, offering employment, and the like. The credit scoring service may communicate with one or more additional credit rating agencies to compare the individual's credit score with those of other agencies. In such scenarios, it is important to protect communications by the financial institution to and from the credit scoring service and between the various credit bureaus (e.g., by recording such communications in a log to prevent tampering and/or revision). In this manner, all parties involved in such communications can document and justify their decision making (e.g., if required under the law).

It will be appreciated that data communications and the transactions such communications support among hardware and software components in a complex computing environment typically take place across computing systems controlled and managed by a variety of disparate entities (e.g., where web services are invoked and/or where software-as-a-service (SaaS) applications are used). In such computing environments, both parties to a given transaction benefit from a reliable record of such communications (e.g., identifying and detailing what information was passed within a request, what information was returned as a response to the request, what action was taken as a result of the response, and the like).

For example, if a financial institution uses credit scoring for a loan decision, the financial institution typically transmits the applying individual's information to a credit scoring service, receives a response from the credit scoring service, and then makes a decision on whether to grant (or deny) a loan to the applying individual. The loan decision by the financial institution may be provided back to the credit scoring service (e.g., for record updating, service improvement, and the like).

Unfortunately, even if data communications are properly authenticated when establishing communication(s) among two or more computing systems (or computing system components), data traffic among these systems and/or components can become compromised. For example, information sent in a request, results received, and/or one or more actions taken could be disrupted or modified, either by a "man in the middle" actor, or by either of the communicating parties, whether maliciously or a result of human or computing error. Such disruption or modification can occur during the transactions, while the transactions are in the process of being recorded (e.g., in logs by one of the parties), or a-posterior (e.g., as the result of log tampering, log modification, log revision, and the like).

Another issue is the desirability of non-repudiation of specific data in such requests, the results returned, or the action taken. For example, if a request containing data items (e.g., the amount and nature of the financial transaction, the income of the applicant, and the like) is sent to a credit scoring service for a scoring a credit application, the response returned by the credit scoring service forms the basis for a decision on whether to grant or deny credit to the applicant.

It will be appreciated that such decisions must be auditable (e.g., because of regulatory requirements, litigation, and the like). There can be no room for disputing the data that was sent in a request, data that was returned in a response, or the action taken (e.g., based on the data sent and received). Therefore, specific action items in a request, the results returned, and/or the action taken must be non-repudiable (e.g., for auditing purposes). Unfortunately, existing computing environments do not provide methods, systems and processes for reconciling requests with results among computing systems and/or computing components executing on disparate computing domains. Disclosed herein are methods, systems, and processes for distributed logging for securing non-repudiable transactions.

Example Distributed Logging Computing System

FIG. 1 is a block diagram of a computing system that performs distributed logging in blockchain computing environments, according to one embodiment. As shown in FIG. 1, such an example blockchain computing environment includes, but is not limited to, a requesting computing system 105, a responding computing system 155, and audit computing systems 185(1)-(N) (which include blockchain logs 125(1)-(N)). Requesting computing system 105, responding computing system 155, and audit computing systems 185(1)-(N) can be any type of computing device(s) including a server, a desktop, a laptop, a tablet, and the like, and are communicatively coupled to each other via network 190, which can be a Storage Area Network (SAN) or any other type of interconnection. For example, requesting computing system 105, responding computing system 155, and audit computing systems 185(1)-(N) can be communicatively coupled via other types of networks and/or interconnections (e.g., a Local Area Network (LAN), a Wide Area Network (WAN), the Internet, and/or the like).

Requesting computing system 105 includes a processor 110, and a memory 115 that implements at least a requestor log 120, a blockchain log 125(1), a transaction engine 130(1), a verification engine 135(1), and an audit engine 140(1). Requesting computing system 105 is communicatively coupled to storage device 145 that stores requested data 150. Similarly, responding computing system 155 includes a processor 160, and a memory 165 that implements at least a responder log 170, a blockchain log 125(2), a transaction engine 130(2), a verification engine 135(2), and an audit engine 140(2). Responding computing system 155 is communicatively coupled to storage device 175 that stores received data 180 (e.g., results of calculations and/or results), and in some embodiments, also requested data 150. Storage devices 145 and 175 can include a variety of different storage devices (e.g., Hard Disk Drives (HDDs), Solid State Drives (SSDs), compact discs, digital versatile discs, Flash memory, and/or logical storage devices (e.g., volumes implemented on such physical storage devices)).

In some embodiments, requestor log 120 records one or more data transactions generated by requesting computing system 105, transaction engine 130(1) manages the one or more data transactions generated by requesting computing system 105 (e.g., queues transactions, prioritizes transactions, cancels transactions, flags transactions, and the like), verification engine 135(1) verifies the one or more data transactions generated by requesting computing system 105 (e.g., verifies the integrity and accuracy of data in the transactions, and the like), and audit engine 140(1) audits the one or more transactions generated by requesting computing system 105 and/or one or more actions taken by requesting computing system 105. For example, requesting computing system 105 can take one or more actions (e.g., in the form of action items) in response to receiving data from responding computing system 155 (e.g., automatically approving a loan application, locating the geographic location of a shipped package using a Global Positioning System (GPS), and the like).

Similarly, in other embodiments, responder log 170 records one or more data transactions generated by responding computing system 155 and/or received from requesting computing system 105, transaction engine 130(2) manages the one or more data transactions generated by responding computing system 155 (e.g., in response to a request from requesting computing system 105), verification engine 135(2) verifies the one or more data transactions generated by responding computing system 155 (e.g., verifies the integrity and accuracy of data in the transactions, and the like), and audit engine 140(2) audits the one or more transactions generated by responding computing system 155 and/or one or more actions taken by responding computing system 155. For example, responding computing system 155 can take one or more actions (e.g., in the form of action items) in response to receiving data from requesting computing system 105.

Example of Blockchain-Based Distributed Logging

A blockchain is a continuously growing list of records (called blocks), which are linked and secured using cryptography. For example, a fingerprinting algorithm, which is an algorithm that maps a large data item (e.g., a computer file, or portions thereof) to a shorter bit string can be used to implement a blockchain. The shorter bit string is referred to as the "fingerprint" of the data item. The fingerprint uniquely identifies the data item, much like a human fingerprint identifies a human being for security-related purposes.

A fingerprint is a value generated for a given data segment. Typically, such fingerprint values need to be substantially unique to each data segment, and thus distinguish data segments from one another. An example of a fingerprint is a hash value. For example, hashing algorithms (also called fingerprinting algorithms) such as Rabin's Algorithm, Message-Digest Algorithm 5 (MD5), Secure Hash Algorithm 512 (SHA-512), and Secure Hash Algorithm 256 (SHA-256) and the like, can be used to generate hash values.

The function of a hashing algorithm is to recreate input data from the hashing algorithm's hash value alone. The input data is typically referred to as the "message" and the hash value is typically referred to as the "message digest" or simply "digest." The ideal hashing algorithm when implemented for cryptographic purposes serves at least four functions: it is easy to compute the hash value for any given message, it is infeasible to generate a message that has a given hash value, it is infeasible to modify the message without changing the hash value, and it is infeasible to find two different messages with the same hash value.

In a blockchain (e.g., blockchain log 125(1) or 125(2)), each block typically includes a hash pointer as a link to a previous block, a timestamp, and transaction data. In certain embodiments, requestor log 120, responder log 170, and blockchain logs 125(1)-(N) are open and distributed hyper-ledgers that can record (e.g., store) data transactions between one or more requesting computing systems (e.g., requesting computing system 105), one or more responding computing systems (e.g., responding computing system 155), and one or more audit computing systems (e.g., audit computing systems 185(1)-(N)).

In existing blockchain-based computing environments that implement a distributed hyper-ledger, a blockchain is typically managed by a peer-to-peer (P2P) network collectively adhering to a protocol for validating new blocks. Once recorded, the data in any given block cannot be altered, modified, and/or revised retroactively without the alteration of all subsequent blocks, which in this case, would require the agreement of the network majority. Unfortunately, as previously noted, data transmitted in a request, results received, and/or one or more actions taken could be disrupted or modified, either by a "man in the middle" actor, or by either of the communicating parties, whether maliciously or a result of human or computing error. Such disruption or modification can occur during transactions, while transactions are in the process of being recorded (e.g., in logs by one of the parties), or a-posterior (e.g., as the result of log tampering, log modification, log revision, and the like).

As noted, the repudiation of data in a centrally managed log (e.g., using a P2P network) can be prevented by using blockchain technology. Unfortunately, managing ledgers in this manner in undesirable in the computing environments discussed above (e.g., computing environments with disparate computing-service provision entities and software and/or hardware components) for at least two reasons. First, although a blockchain can be secured using cryptography, a malicious "man in the middle" actor and/or human and/or computing error can significantly increase the time required to validate information between two or more parties on disparate computing domains. This can cause logistical problems (e.g., for shipping companies, financial institutions, and the like) with respect to downtime, business performance, and customer satisfaction. Second, the problem is exacerbated where time-sensitive answers are required for business questions and/or queries (e.g., a loan decision, the location of a package in real time, and the like) because existing ledgers in blockchain computing environments require a collusion of the network majority—thus considerably increasing the cyber security and computational resources required to effectively and reliably secure such transactions (e.g., faster network speed, faster (and more expensive) storage devices, a high-level of network security, and the like). Therefore, in certain embodiments, to increase the speed and security of validating and auditing such transactions, the computing system of FIG. 1 implements distributed logging, where blockchain logs are separately maintained by requesting computing system 105, responding computing system 155, and if necessary, audit computing systems 185(1)-(N).

In one embodiment, a distributed or public ledger technique (e.g., a blockchain, and the like) can be used to enable the creation of records protected from tampering and revision (e.g., using separate requestor and responder logs like requestor log 120 and responder log 170 maintained separately by communicating computing entities such as requesting computing system 105 and responding computing system 155). In this example, such records, or blocks, can be used to hold data or information passed or transmitted as part of one or more transactions between one or more elements (e.g., software components) of a computing system in the form of an incorruptible and non-repudiable log. It will be appreciated that this incorruptible and non-repudiable log can be used to arbitrate (e.g., by auditing) issues arising from unexpected results or actions taken by a computing system or computing component thereof, as well as providing a reliable and continuously auditable record of recorded transactions.

In certain embodiments, requesting computing system 105 (or a hardware/or software component thereof) transmits request information (e.g., in the form of a request message) and adds the request information in a blockchain (e.g., in blockchain 125(1) maintained by both requesting computing system 105 and audit computing systems 185 (1)-(N)), thus sharing the request information with responding computing system 155. In this manner, the response from responding computing system 155 can be expedited (e.g., as the processing performance of a distributed ledger may not be tolerated from a response time point of view). When responding computing system 155 (or a hardware/or software component thereof) transmits a response back to requesting computing system 105 (or to a hardware/or software component thereof), a copy of the response and the request information is added to a blockchain (e.g., blockchain log 125(2)), and this addition of the copy of the response and the request information to the blockchain is shared with requesting computing system 105. In certain other embodiments, requesting computing system 105 separately stores the request information and the information received from responding computing system 155 including any action items executed in response to the received information in requestor log 120, and similarly, responding computing system 155 separately stores the request information received from requesting computing system 105 and the response sent to requesting computing system 105 in responder log 170. In this manner, requesting computing system 105 and responding computing system 155 can be configured with program instructions to perform blockchain-based distributed (and separate) logging.

In certain other embodiments, the information stored by requesting computing system 105 in requestor log 120 and/or blockchain log 125(1), and by responding computing system 155 in responder log 170 and/or blockchain log 125(2) may be in encoded form (e.g., by using a hashing algorithm or other kind of encryption). Encoding stored information in this manner may provide protection for the recorded information and may also serve to reduce the amount of storage needed to store the information. Because of the aforementioned properties of hashing function(s), comparison of stored values for auditing purposes may be performed on the hashed values in a first instance, since it is extremely unlikely two different data items will hash to the same value. Only upon discrepancy it may be necessary to reverse engineer the hash value to compare the original information stored in two different locations.

It will be appreciated that either requesting computing system 105 and/or responding computing system 155 can refer to the blockchain entry of interest and compare separately recorded information with the request and/or response data. For example, if there are no discrepancies, the transaction can be considered legitimate and no further processing is required. However, if a discrepancy is noted, the transaction may be flagged for further processing (e.g., including a retry if appropriate, triggering a manual or automated audit, and the like)—without immediately requiring time-consuming validation by network majority.

Examples of Authenticate-Request-Response-Action Using Separate Logging

Figure 2:
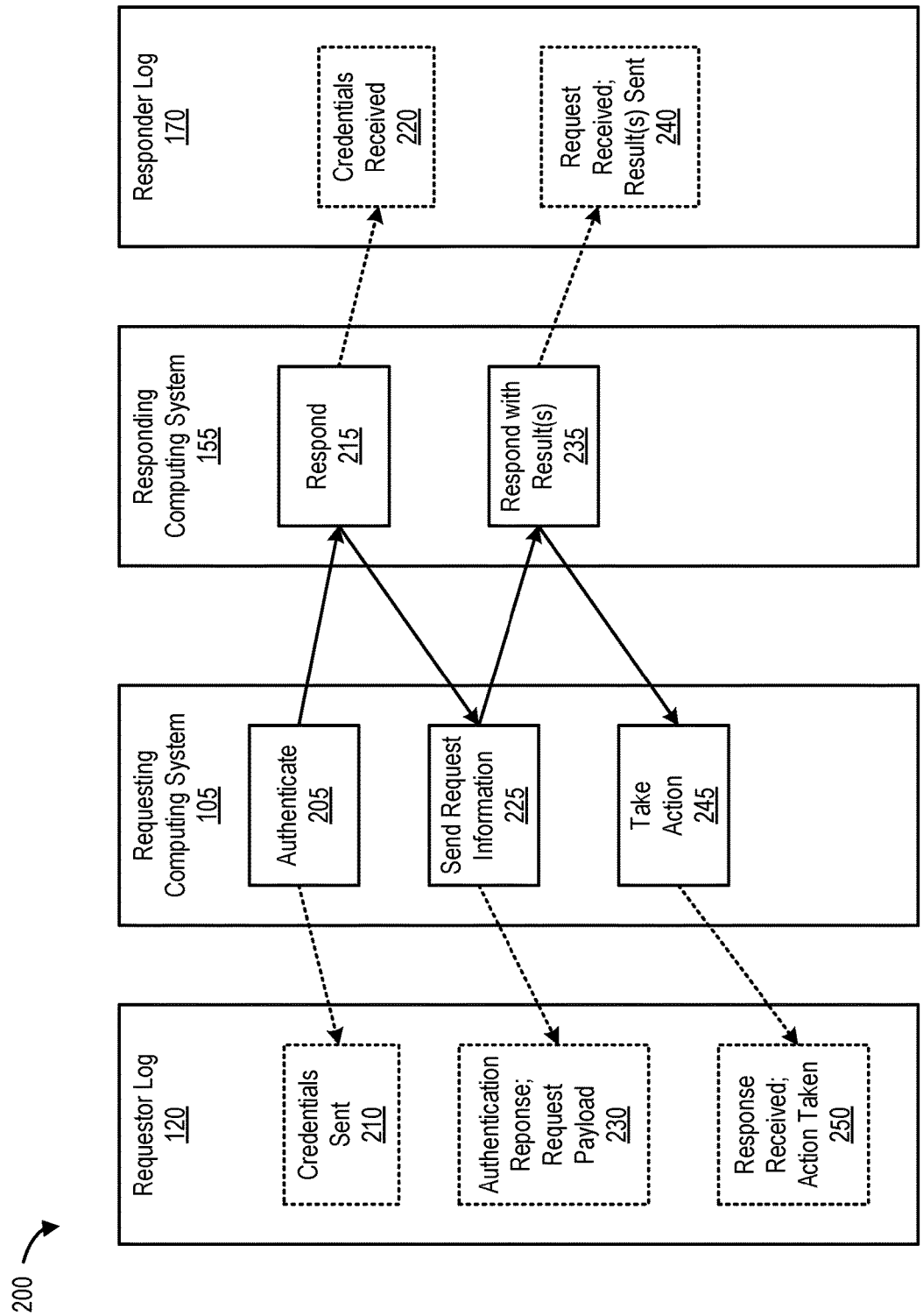
FIG. 2 is a block diagram of a two-party example of an authenticate-request-response-action with separate logging system, according to one embodiment of the present disclosure.

FIG. 2 is a block diagram of a two-party example of an authenticate-request-response-action with separate logging system, according to one embodiment. As shown in FIG. 2, requesting computing system 105 authenticates request information at 205 and transmits the authentication information to responding computing system 155 and records the credentials transmitted to responding computing system 155 in requestor log 120 (shown at 210). Responding computing system 155 responds at 215 and records the credentials received in responder log 170 (shown at 220). At 225, requesting computing system 105 sends request information (e.g., in the form of a request message, and the like) to responding computing system 155 and records in requestor log 120 the authentication response received and the details of the payload requested (e.g., the request message, shown at 230). Responding computing system 155 then responds with result(s) (shown at 235) and records the request received and results sent to requesting computing system 105 in responder log 170 (shown at 240). Requesting computing system 105 then takes action (e.g., based on one or more action items) (shown at 245) and records in requestor log 120 the response received and action(s) taken (shown at 250). It should be noted that recording information in requestor log 120 by requesting computing system 105 and in responder log 170 by responding computing system 155 can be performed by requesting computing system 105 and by responding computing system 155 (e.g., after receiving authentication, a response, a request message, a payload request, confirmation of action taken, and the like) before, contemporaneously, simultaneously, or within a specified period of time (e.g., within ten (10) seconds of transmitting information, or within a period of time determined by a cyber-security administrator, based on a threat or priority level, and the like).

Figure 3:
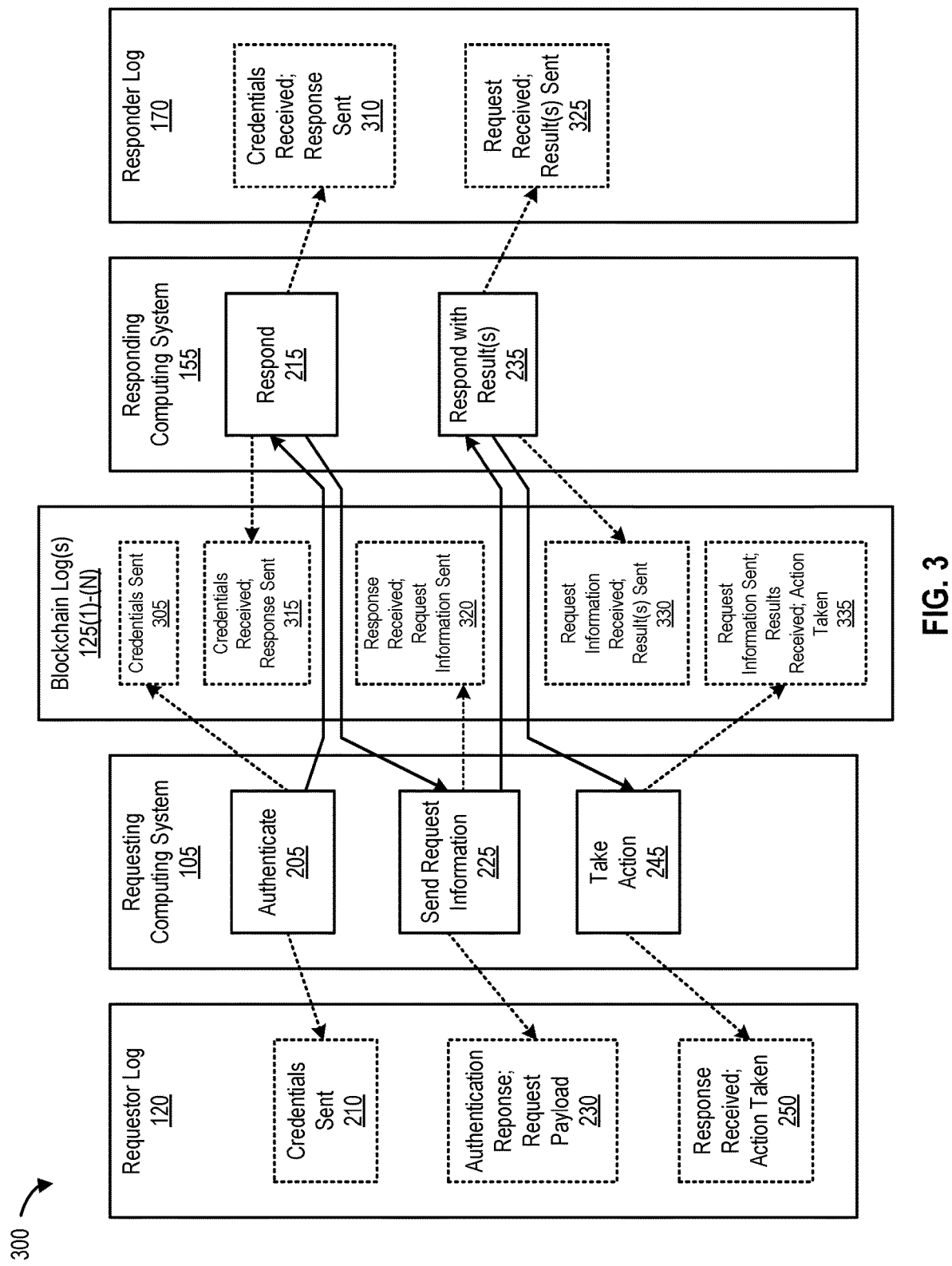
FIG. 3 is a block diagram of a two-party example of an authenticate-request-response-action with separate logging system with blockchain and separate logging, according to one embodiment of the present disclosure.

FIG. 3 is a block diagram of a two-party example of an authenticate-request-response-action with separate logging system with blockchain and separate logging, according to one embodiment. As shown in FIG. 3, requesting computing system 105 requests credential authentication (shown at 205) and this information is recorded both in requestor log 120 (shown at 210) and in blockchain log 125(1) (shown at 305) by requesting computing system 105. Responding computing system 155 then responds (shown at 215) and records both in responder log 170 and blockchain log 125(2) (shown at 310 and 315, respectively) the credentials received from requesting computing system 105 and the response sent to requesting computing system 105 (e.g., authenticating requesting computing system 105). Requesting computing system 105 then sends request information (e.g., in the form of a request message, and the like) to responding computing system 155 (shown at 225) and records the response received and the request information sent to responding computing system 155 in blockchain log 125(1) (shown at 320), and the authentication response received and details of the payload requested (e.g., the request message) in requestor log 120 (shown at 230). Responding computing system 235 then responds with result(s) (shown at 235) and records the request information received and the result(s) sent in blockchain log 125(2) (shown at 330), and that request was received and result(s) were sent in responder log 170 (shown at 325).

Requesting computing system 105 finally takes action (e.g., based on one or more action items, and the like) (shown at 245) and records in blockchain log 125(1) the request information sent, results received, and action taken (shown at 335), and the response received and action taken in requestor log 120 (shown at 250). It should be noted that recording information in requestor log 120 and blockchain log 125(1) by requesting computing system 105 and in responder log 170 and blockchain log 125(2) by responding computing system 155 can be performed by requesting computing system 105 and by responding computing system 155 (e.g., after receiving authentication, a response, a request message, a payload request, confirmation of action taken, and the like) before, contemporaneously, simultaneously, or within a specified period of time (e.g., within five (5) seconds of transmitting information, or within a period of time determined by a cyber-security administrator, based on a threat or priority level of the transaction, and the like).

It should be noted that the information that gets recorded in requestor log 120 and responder log 170 is actual information or data generated by each party, received by each party, and transmitted between parties (e.g., credentials, requests, responses, actions, and the like).

Example Auditing Process that Utilizes Separate Logging

Figure 4:
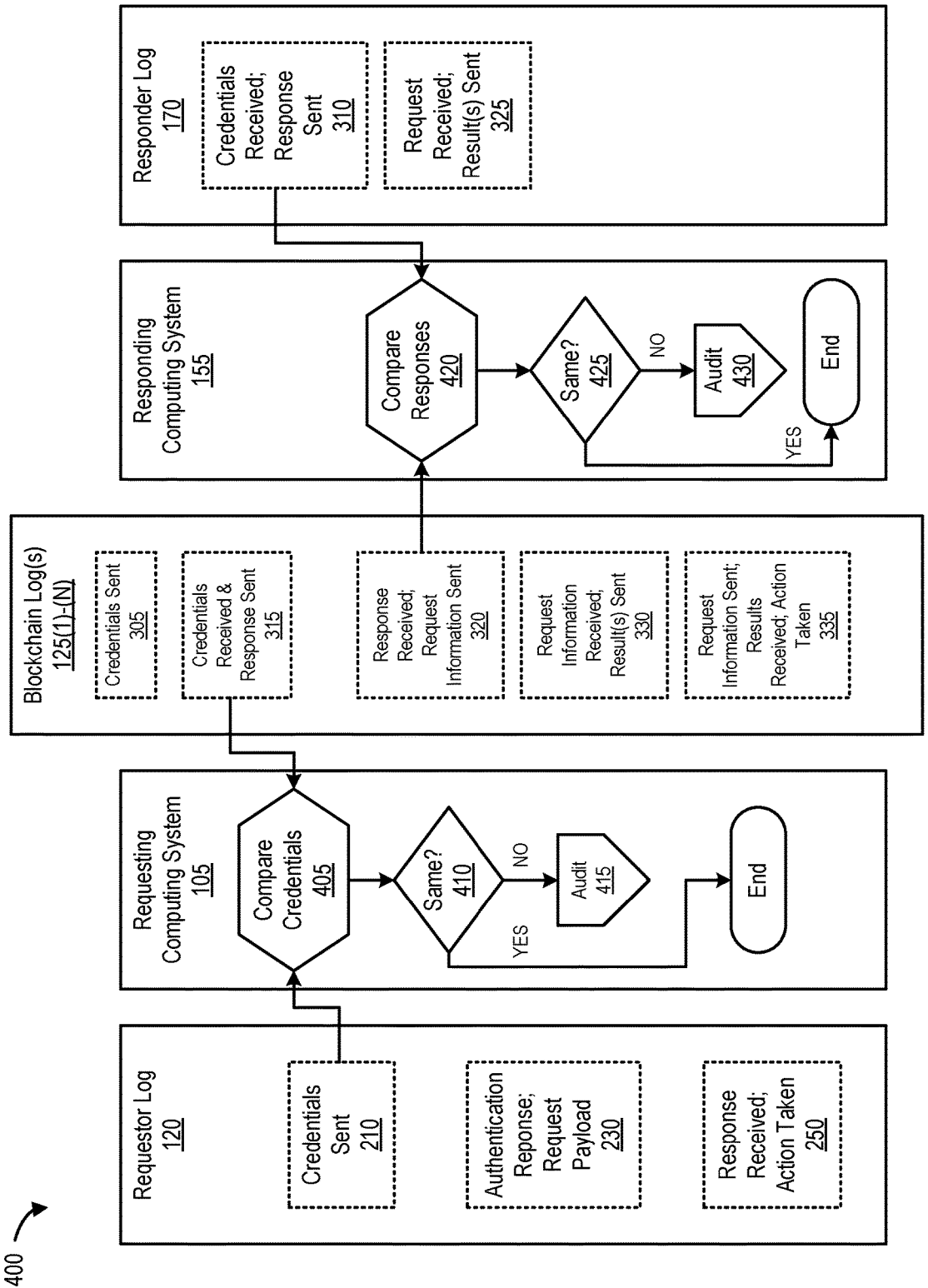
FIG. 4 is a block diagram of an auditing process by request and response actors in a two-party system, according to one embodiment of the present disclosure.

FIG. 4 is a block diagram of an auditing process by request and response computing entities in a two-party system, according to one embodiment. If there is a need to verify or validate transaction information (or portions thereof), requesting computing system compares credentials (shown at 405) by accessing requestor log 120 and blockchain log 125(1) (which separately record the credentials sent (shown at 210 and 305, respectively), the credentials received, and the response sent (shown at 315)). If the credentials are not the same (shown at 410), requesting computing system 105 and/or one or more of audit computing systems 185(1)-(N) can perform a more extensive auditing process (shown at 415). Responding computing system then compares responses (shown at 420) by accessing both blockchain log 125(2) and responder log 170 (which separately record the response received and the request information sent (shown at 320), and whether credentials were received and whether response was sent (shown at 310)). If the responses are not the same (shown at 425) responding computing system 155 and/or one or more of audit computing systems 185(1)-(N) perform a more extensive auditing process (shown at 430). In this manner, and as will be appreciated, by separately maintaining, storing, recording, and/or logging transaction information (in requestor log 120 and responder log 170, respectively) and collectively maintaining transaction information (in blockchain logs 125(1)-(N))), requesting computing system 105 and/or responding computing system 155 can independently audit transaction information of one or more data transactions between one or more components of requesting computing system 105 and responding computing system 155 without waiting for collusion and/or agreement from the network majority.

Example Computing System for Maintaining a Distributed Ledger and Separate Logs

Figure 5:
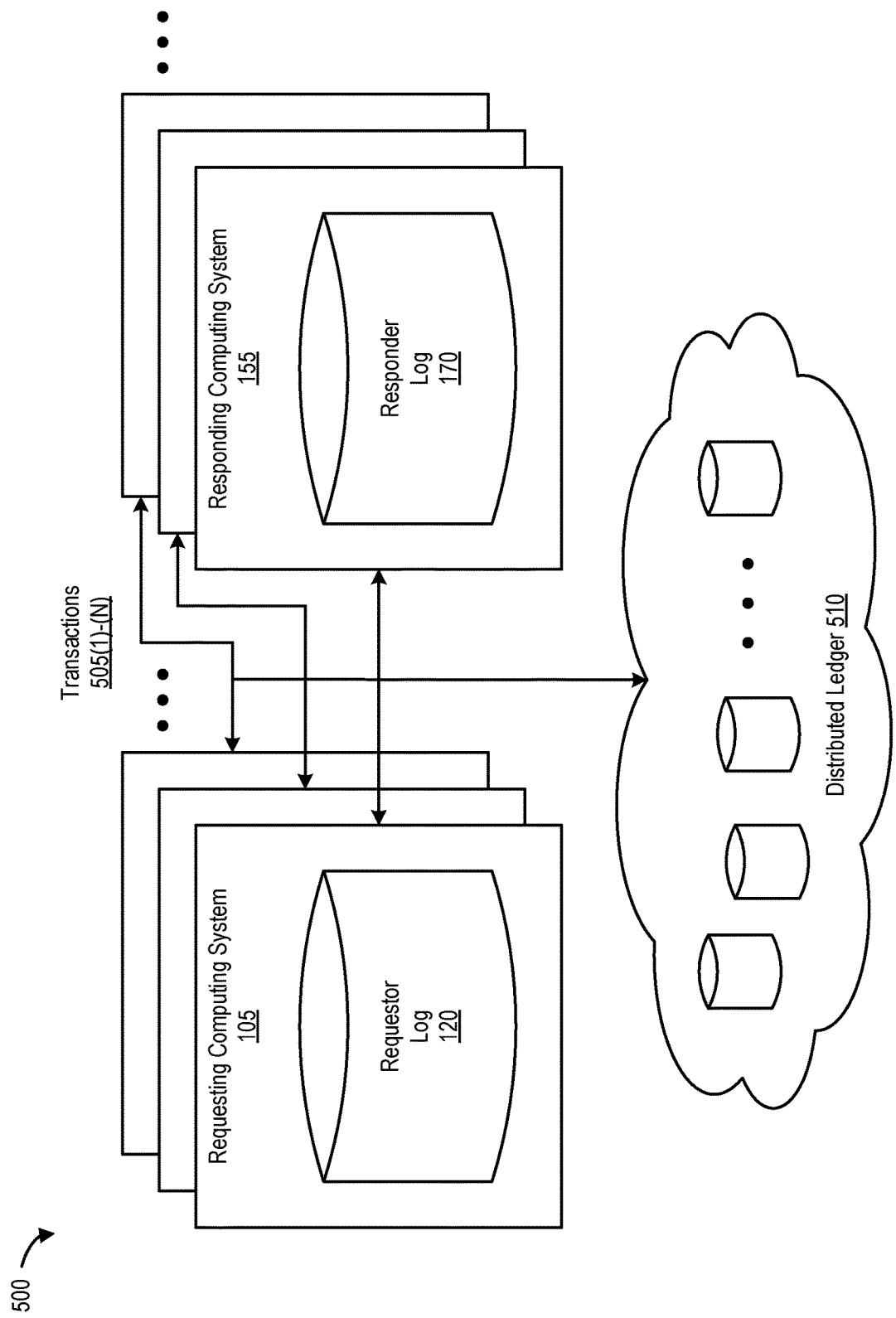
FIG. 5 is a block diagram of a computing system that implements a distributed ledger, according to one embodiment of the present disclosure.

FIG. 5 is a block diagram of a computing system that implements a distributed ledger, according to one embodiment. As shown in FIG. 5, requesting computing system 105 and responding computing system 155 can generate, manage, verify, audit, and secure (data) transactions 505(1)-(N) between themselves or between one or more components of requesting computing system 105 and responding computing system 155 that are separately recorded in requestor log 120 and responder log 170, respectively, and collectively recorded in distributed ledger 510 (e.g., blockchain logs 125(1)-(N) as shown in FIGS. 1 and 3.

In one embodiment, responding computing system 155 receives a request message from requesting computing system 105. In this example, the request message includes action items, and the action items are associated with one or more transactions (e.g., transactions 505 (1)-(N)) between requesting computing system 105 (or one or more requesting computing systems and/or components thereof) and responding computing system 155 (or one or more responding computing systems and/or components thereof). The action items are added to requestor log 120 by requesting computing system 105 prior to the request message being transmitted to responding computing system 155. The action items are also stored in responder log 170 by responding computing system 155 before data responsive to the action items is transmitted to requesting computing system 105.

In some embodiments, responding computing system 155 access a blockchain log (e.g., blockchain log 125(2) as shown in FIGS. 1 and 3) upon receiving the request message from requesting computing system 105. Responding computing system 155 then determines that the action items in the request message are stored in the blockchain log and updates the blockchain log to indicate transmission of the data responsive to the action items prior to transmitting the data to requesting computing system 105.

In certain embodiments, a copy of the blockchain log is maintained by requesting computing system 105, responding computing system 155, and one or more external computing systems (e.g., such as audit computing systems 185(1)-(N)) (as shown in FIG. 1). The blockchain log(s) (e.g., distributed ledger(s), and the like) can be accessed by either requesting computing system 105 and/or responding computing system 155 (in conjunction with requestor log 120 and responder log 170, respectively) to perform an audit transaction (e.g., using audit engine 140(1) and 140(2), respectively) to verify one or more transactions between requesting computing system 105 and responding computing system 155.

It will be appreciated that the separate logging system as shown in FIG. 5 can provide, among other benefits, throughput and latency approaching database speeds; richer, more flexible, business-specific confidentiality models; network policy management through distributed governance; and robust support for non-repudiable transactions.

Processes for Securing Non-Repudiable Transactions Using Separate Logging

Figure 6A:
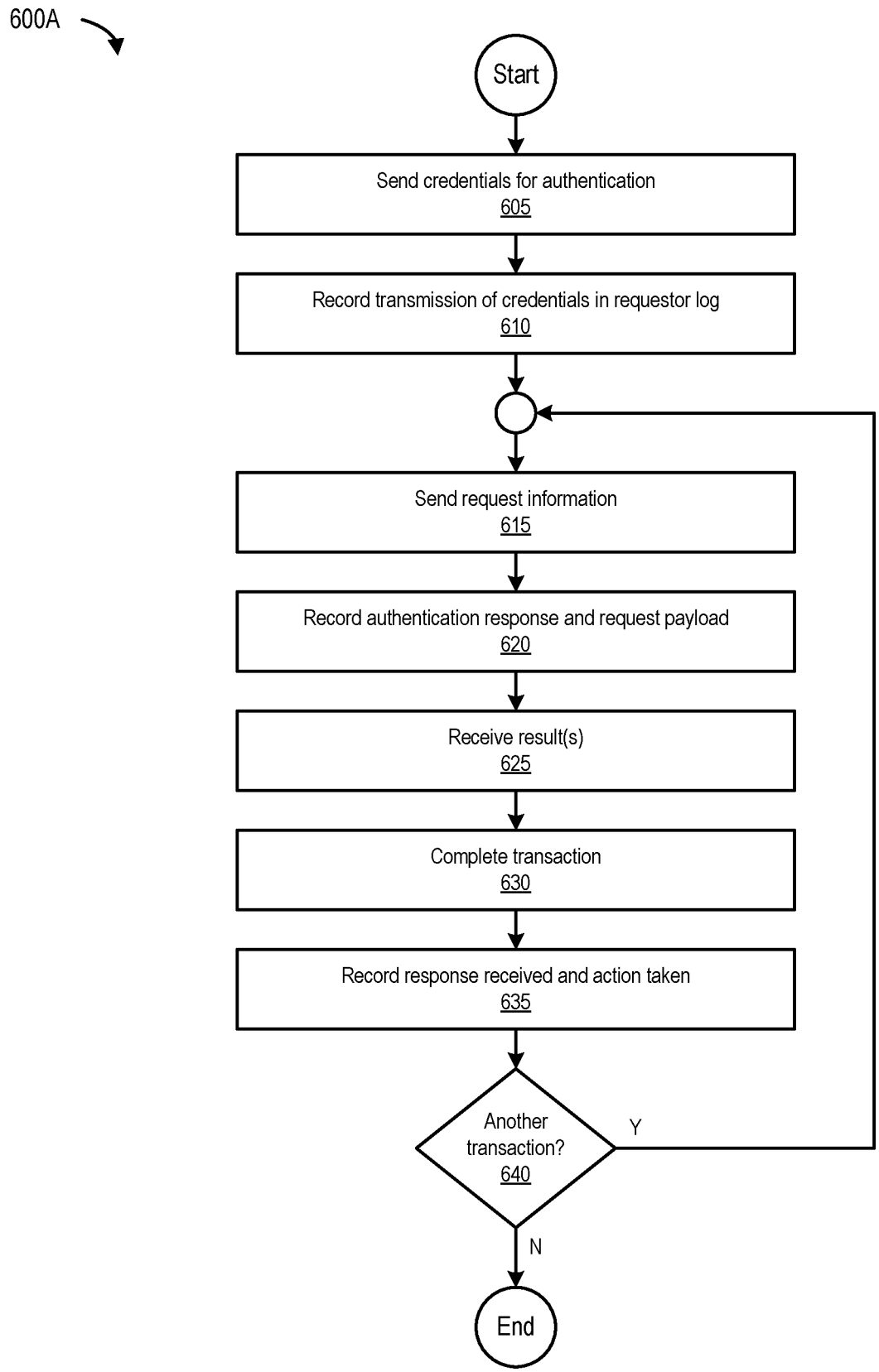
FIG. 6A is a flowchart of a process for recording requests, responses, and results by a requesting computing system using distributed logging, according to one embodiment of the present disclosure.

FIG. 6A is a flowchart of a process for recording requests, responses, and results by a requesting computing system using distributed logging, according to one embodiment. The process begins at 605 by sending credentials for authentication (e.g., to responding computing system 155), and at 610 records the transmission of credentials in a requestor log (e.g., requestor log 120). At 615, the process sends request information (e.g., to responding computing system 155 in the form of a request message), and at 620 records the authentication response and request payload (e.g., in requestor log and in blockchain log 125(1)). At 625, the process receives result(s), and at 630 completes the transaction (e.g., by executing one or more action items). At 635, the process records the response received, and the action taken (e.g., in requestor log 120 and/or blockchain log 125(1)). At 640, the process determines if there is another transaction. If there is another transaction, the process loops to 615. Otherwise, the process ends.

Figure 6B:
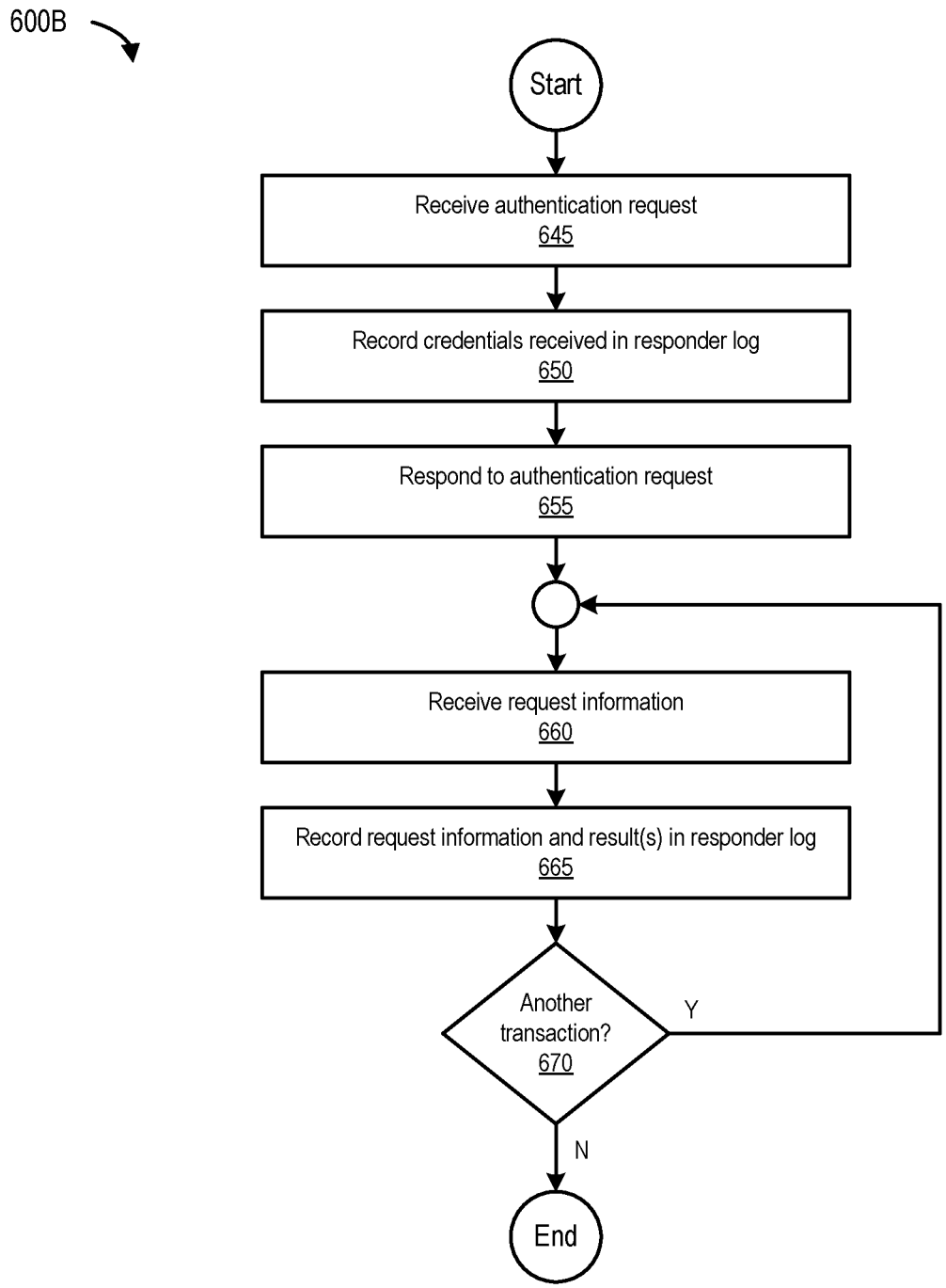
FIG. 6B is a flowchart of a process for recording requests and responses by a responding computing system using distributed logging, according to one embodiment of the present disclosure.

FIG. 6B is a flowchart of a process for recording requests and responses by a responding computing system using distributed logging, according to one embodiment. The process begins at 645 by receiving an authentication request (e.g., from requesting computing system 105). At 650, the process records the credentials received in a responder log (e.g., in responder log 170), and at 655, responds to the authentication request. At 660, the process receives request information, and at 665, records said request information and the corresponding result(s) transmitted in the responder log. At 670, the process determines if there is another transaction. If there is another transaction, the process loops to 660. Otherwise, the process ends.

Figure 7A:
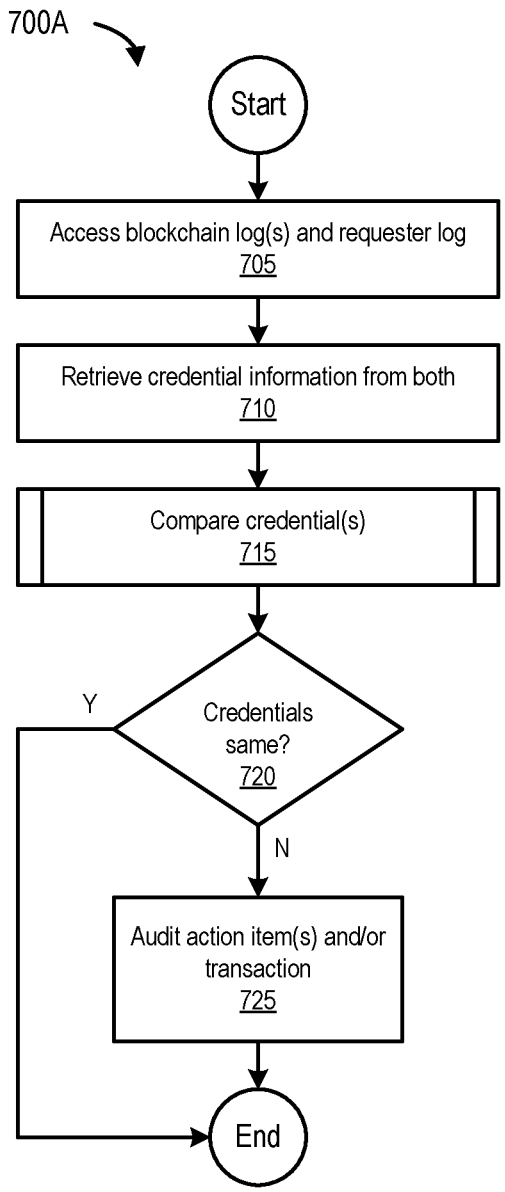
FIG. 7A is a flowchart of a requestor side auditing process using a blockchain log, according to one embodiment of the present disclosure.

FIG. 7A is a flowchart of a requestor side auditing process using a blockchain log, according to one embodiment. The process begins at 705 by accessing a blockchain log (e.g., blockchain log 125(1)) and a requestor log. At 710, the process receives credential information from both the blockchain log and the requestor log. At 715, the process compares the credentials (e.g., using verification engine 135(1)). If the credentials are the same, the process ends. If the credentials are not the same, the process, at 725, audits action item(s) and/or transaction(s) (e.g., using audit engine 140(1)) (it should be noted that other aspects of the overall workflow described in FIG. 7A may be audited, beyond actions and transactions). The process then ends.

Figure 7B:
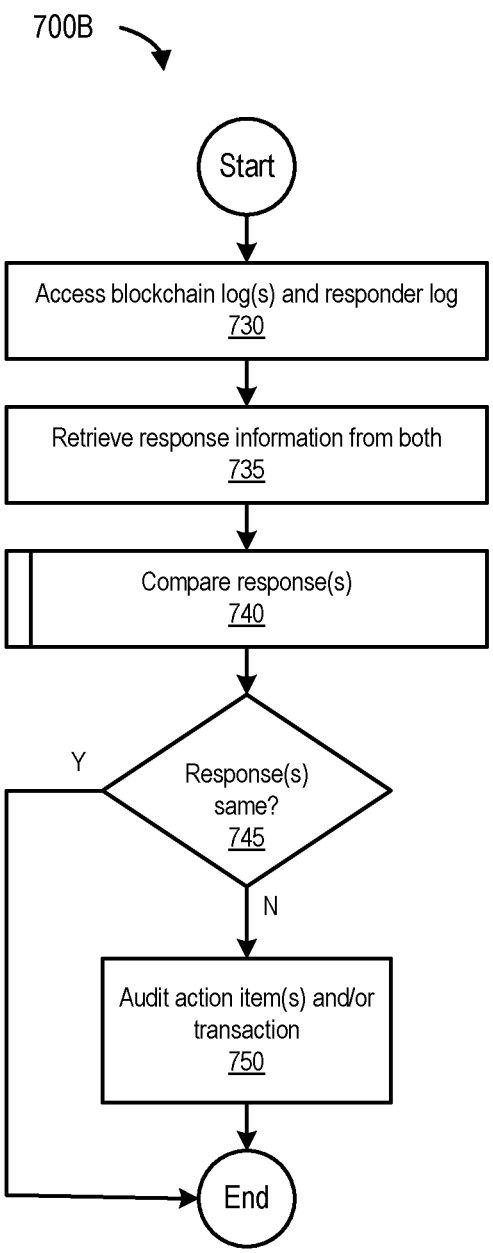
FIG. 7B is a flowchart of a responder side auditing process using a blockchain log, according to one embodiment of the present disclosure.

FIG. 7B is a flowchart of a responder side auditing process using a blockchain log, according to one embodiment. The process begins at 730 by accessing a blockchain log (e.g., blockchain log 125(2)) and a responder log. At 735, the process retrieves response information from both the blockchain and the responder log. At 740, the process compares the response(s) (e.g., using verification engine 135(2)), and at 745, determines whether the responses are the same. If the responses are the same, the process ends. If the responses are not the same, the process, at 750, audits action items and/or transactions (e.g., using audit engine 140(2)) (it should be noted that other aspects of the overall workflow described in FIG. 7B may be audited, beyond actions and transactions). The process then ends.

It should be noted that one or more of the processes of FIGS. 6A, 6B, 7A, and 7B may be performed and/or executed concurrently and/or in parallel in one or more embodiments. For example, sending credentials for authentication and recording the transmission of credentials in a requestor log may be performed concurrently by a requesting computing system. Similarly, recording credentials received in a responder log and responding to an authentication request may be performed concurrently by a responding computing system.

It will be appreciated that as enterprises and business (e.g., shipping companies, internet retailers, financial institutions, and the like) seek to apply blockchain technology to meet their business needs, they can be faced with the fact that existing blockchain protocols (e.g., the majority collusion requirement, and the like) may fail to meet key enterprise requirements such as performance, confidentiality, governance, and required processing, network, and computational power. One reason can be because existing blockchain-based computing systems were designed to function and to achieve consensus in public scenarios amongst anonymous and untrusted actors with maximum transparency. Because of these limitations, transactions are posted "in the clear" for all to see, every node in a given network (or at least a majority) must execute every transaction, and computationally intensive consensus algorithms must be employed. These requirements, among others, can negatively affect enterprise requirements such as scalability, transaction time, customer satisfaction, and confidentiality.

Therefore, it will be appreciated that the systems, methods, and processes described and disclosed herein provide an alternate approach to ledger construction and management in blockchain computing environments by providing for separate and distributed logging for securing non-repudiable transactions, thus providing enterprises and businesses the scalability, distributed governance, and enhanced confidentiality they need (e.g., by reducing the need for faster computational and network resources to verify and audit transactions, among other benefits), without sacrificing the inherent security and immutability they expect (e.g., by providing redundancy in the manner in which distributed ledgers are created and managed).

Example Computing Environment

Figure 8:
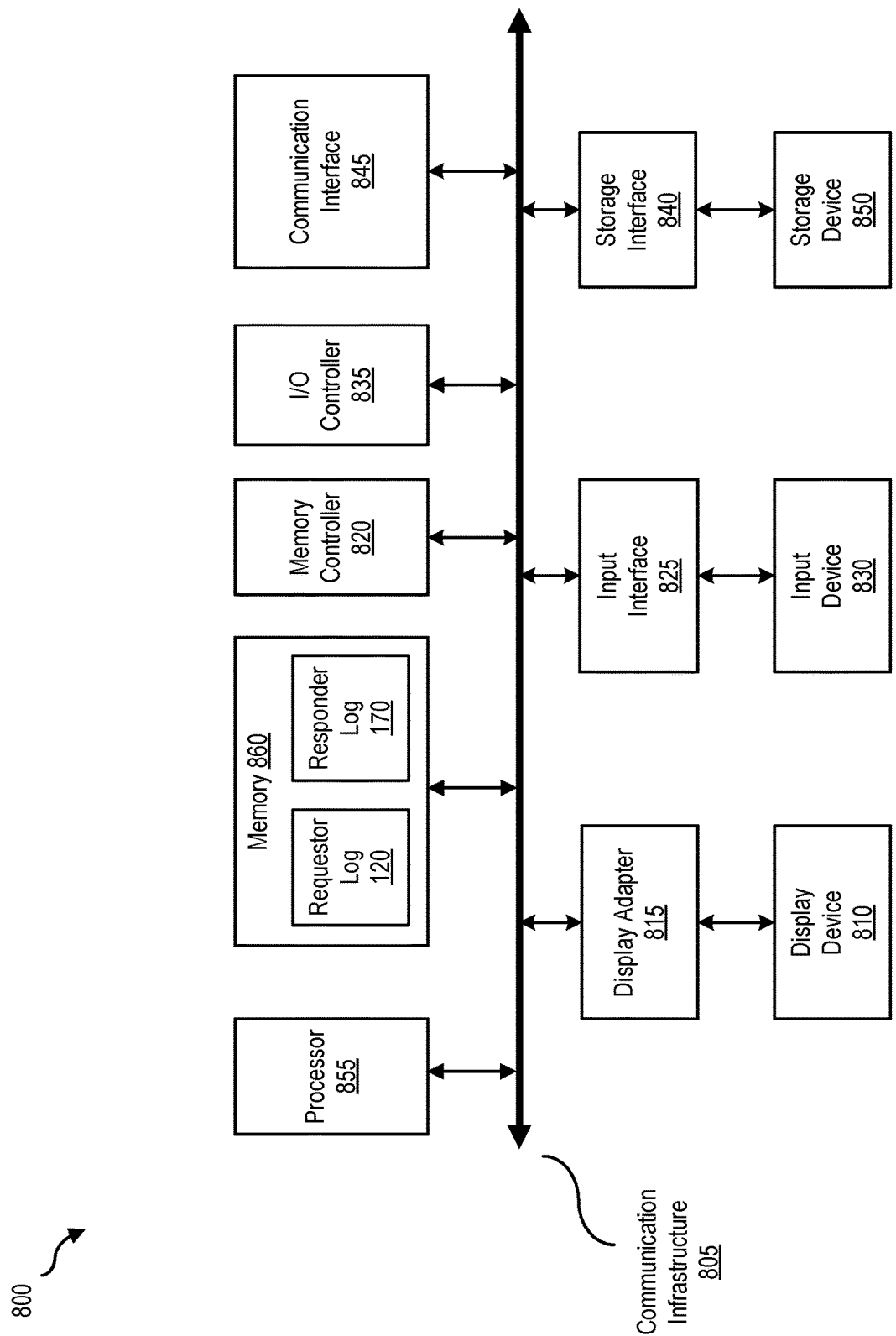
FIG. 8 is a block diagram 800 of a computing system, illustrating how distributed logging can be implemented in software, according to one embodiment of the present disclosure.

FIG. 8 is a block diagram 800 of a computing system, illustrating how separate logs can be implemented in software, according to one embodiment. Computing system 800 can include requesting computing system 105 and/or responding computing system 155 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that implements a requestor log and or a responder log, computing system 800 becomes a special purpose computing device that is configured to provide distributed logging to secure non-repudiable transactions.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing an audit engine and/or a transaction engine may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850, storage device 145 and/or storage device 175. When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
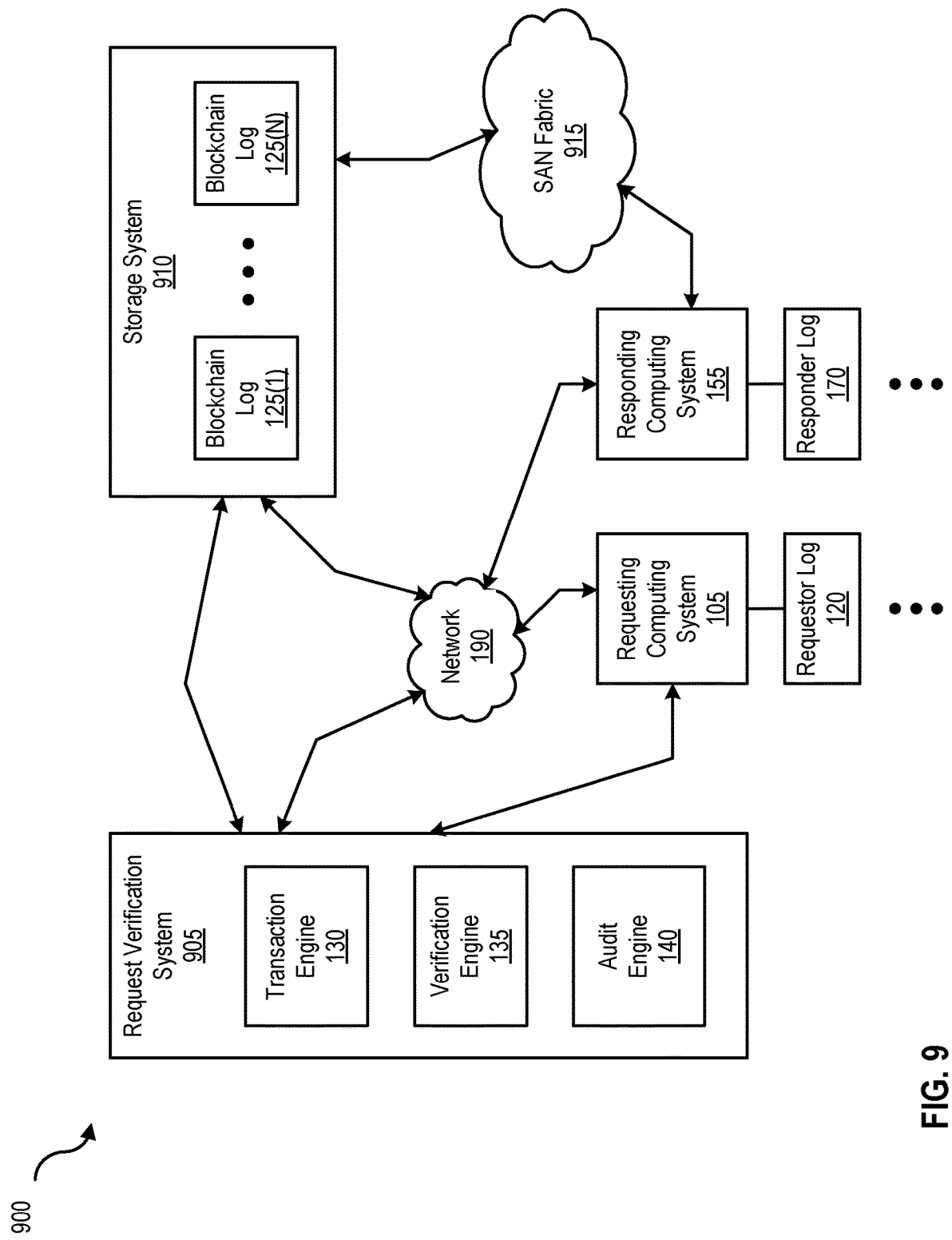
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with requesting computing system 105 and/or responding computing system 155. Network 190 generally represents any type or form of computer network or architecture capable of facilitating communication between requesting computing system 105, responding computing system 155, and/or audit computing systems 185(1)-(N).

In certain embodiments, a communication interface, such as communication interface 845 in FIG. 8, may be used to provide connectivity between requesting computing system 105, responding computing system 155, and/or audit computing systems 185(1)-(N), and network 190. The embodiments described and/or illustrated herein are not limited to the Internet or any particular network-based environment. In some embodiments, network 190 can be a Storage Area Network (SAN). In other embodiments, request verification system 905 may be part of requesting computing system 105, responding computing system 155, and/or storage system 910, or may be separate. If separate, request verification system 905 and requesting computing system 105, responding computing system 155, and/or audit computing systems 185(1)-(N) may be communicatively coupled via network 190.

In one embodiment, all or a portion of one or more of the disclosed embodiments may be encoded as a computer program and loaded onto and executed by requesting computing system 105, responding computing system 155, and/or audit computing systems 185(1)-(N), or any combination thereof. All or a portion of one or more of the embodiments disclosed herein may also be encoded as a computer program, stored on requesting computing system 105, responding computing system 155, and/or audit computing systems 185(1)-(N), storage devices 145 and/or 175, and distributed over network 190.

In some examples, all or a portion of requesting computing system 105, responding computing system 155, and/or audit computing systems 185(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, requestor log 120 and responder log 170 may transform the behavior of requesting computing system 105 and responding computing system 155, respectively, in order to cause requesting computing system 105 and/or responding computing system 155 to provide separate and distributed logging to secure non-repudiable transactions.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
receiving a request message from a requesting computing system, wherein the request message comprises one or more action items,
the one or more action items are associated with a transaction between the requesting computing system and a responding computing system, and
the one or more action items are added to a requestor log by the requesting computing system, wherein the requestor log is non-repudiable, and wherein the one or more action items are added to the requestor log on a transaction-by-transaction basis without requiring consensus from a network majority or a block of transactions to be formed;
storing the one or more action items in a responder log, wherein the responder log is non-repudiable, and wherein the one or more action items are added to the responder log on a transaction-by-transaction basis without requiring consensus from the network majority or the block of transactions to be formed; and
transmitting data responsive to the one or more action items to the requesting computing system.

2. The computer-implemented method of claim 1, further comprising:
accessing a tamper-evident log upon receiving the request message; and
determining that the one or more action items in the request message is stored in the tamper-evident log.

3. The computer-implemented method of claim 2, further comprising:
updating the tamper-evident log to indicate transmission of the data responsive to the one or more action items prior to transmitting the data to the requesting computing system.

4. The computer-implemented method of claim 1, wherein
the requestor log is maintained by the requesting computing system, and
the responder log is maintained by the responding computing system.

5. The computer-implemented method of claim 2, wherein a copy of the tamper-evident log is maintained by the requesting computing system, the responding computing system, and an external computing system.

6. The computer-implemented method of claim 2, further comprising:
accessing the tamper-evident log; and
performing an audit transaction to verify the transaction between the requesting computing system and the responding computing system.

7. The computer-implemented method of claim 2, wherein
the tamper-evident log is a distributed ledger.

8. The method of claim 1, wherein:
the one or more action items are also logged by an audit computing system in an audit log that is non-repudiable.

9. The method of claim 1, wherein:
the responder log and the requestor log are business-specific and confidential.

10. The method of claim 1, wherein:
the method is performed with means for an authenticate-request-response-action with separate logging systems.

11. The method of claim 1, comprising:
steps for auditing by request and response actors.

12. The method of claim 1, wherein:
the responder log is updated with means for implementing a distributed ledger.

13. The method of claim 1, comprising:
steps for recording requests including the request.

14. The method of claim 1, comprising:
steps for recording requests, responses, and results by the requesting computing system.

15. The method of claim 1, comprising:
steps for recording requests, responses, and results by the responding computing system.

16. The method of claim 1, comprising:
steps for requestor-side auditing.

17. The method of claim 1, comprising:
steps for responder-side auditing.

18. The method of claim 1, the responding computing system comprises:
the responder log;
a transaction engine;
a verification engine; and
an audit engine, wherein:
the responder log is rendered non-repudiable by a directed graph of cryptographic hash pointers.

19. A tangible, non-transitory, machine-readable medium storing instructions that when executed cause operations comprising:
receiving a request message from a requesting computing system, wherein the request message comprises one or more action items,
the one or more action items are associated with a transaction between the requesting computing system and a responding computing system, and
the one or more action items are added to a requestor log by the requesting computing system, wherein the requestor log is non-repudiable, and wherein the one or more action items are added to the requestor log on a transaction-by-transaction basis without requiring consensus from a network majority or a block of transactions to be formed;
storing the one or more action items in a responder log, wherein the responder log is non-repudiable, and wherein the one or more action items are added to the responder log on a transaction-by-transaction basis without requiring consensus from the network majority or the block of transactions to be formed; and
transmitting data responsive to the one or more action items to the requesting computing system.

* * * * *